Aug. 2, 1966  R. J. LOOFBOURROW  3,264,574
AMPLIFIER SYSTEM

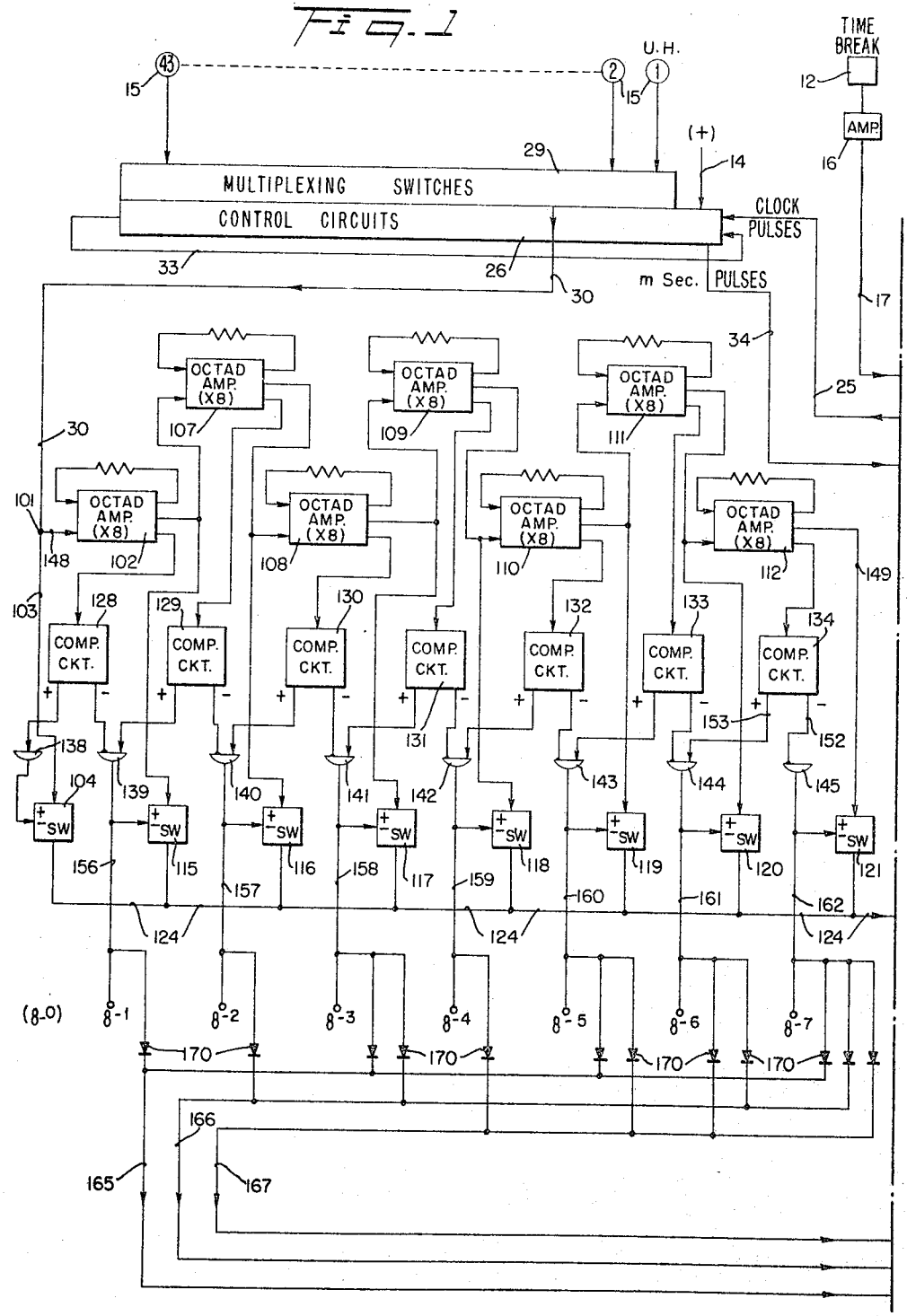

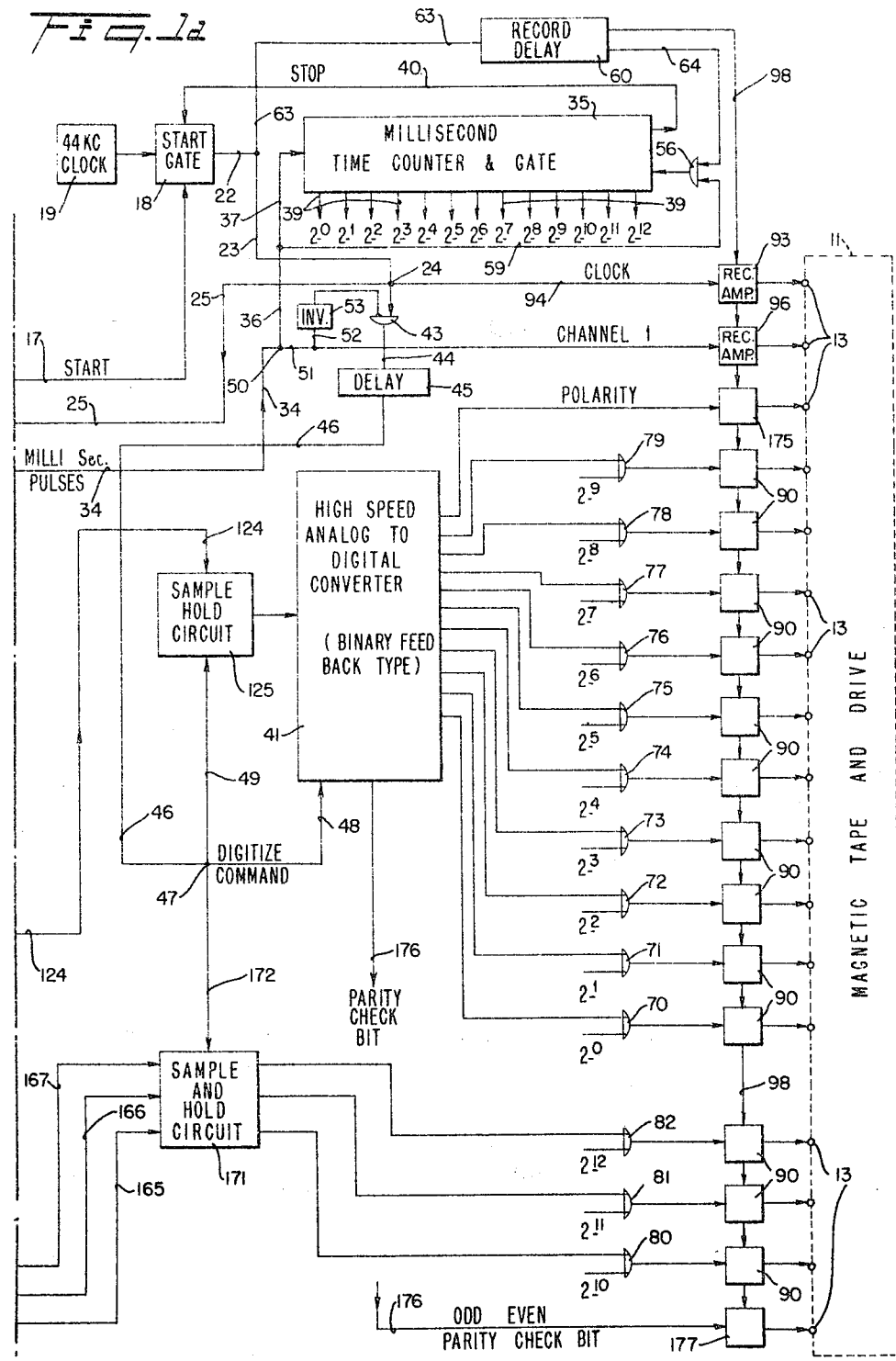

Original Filed Oct. 14, 1959  4 Sheets-Sheet 3

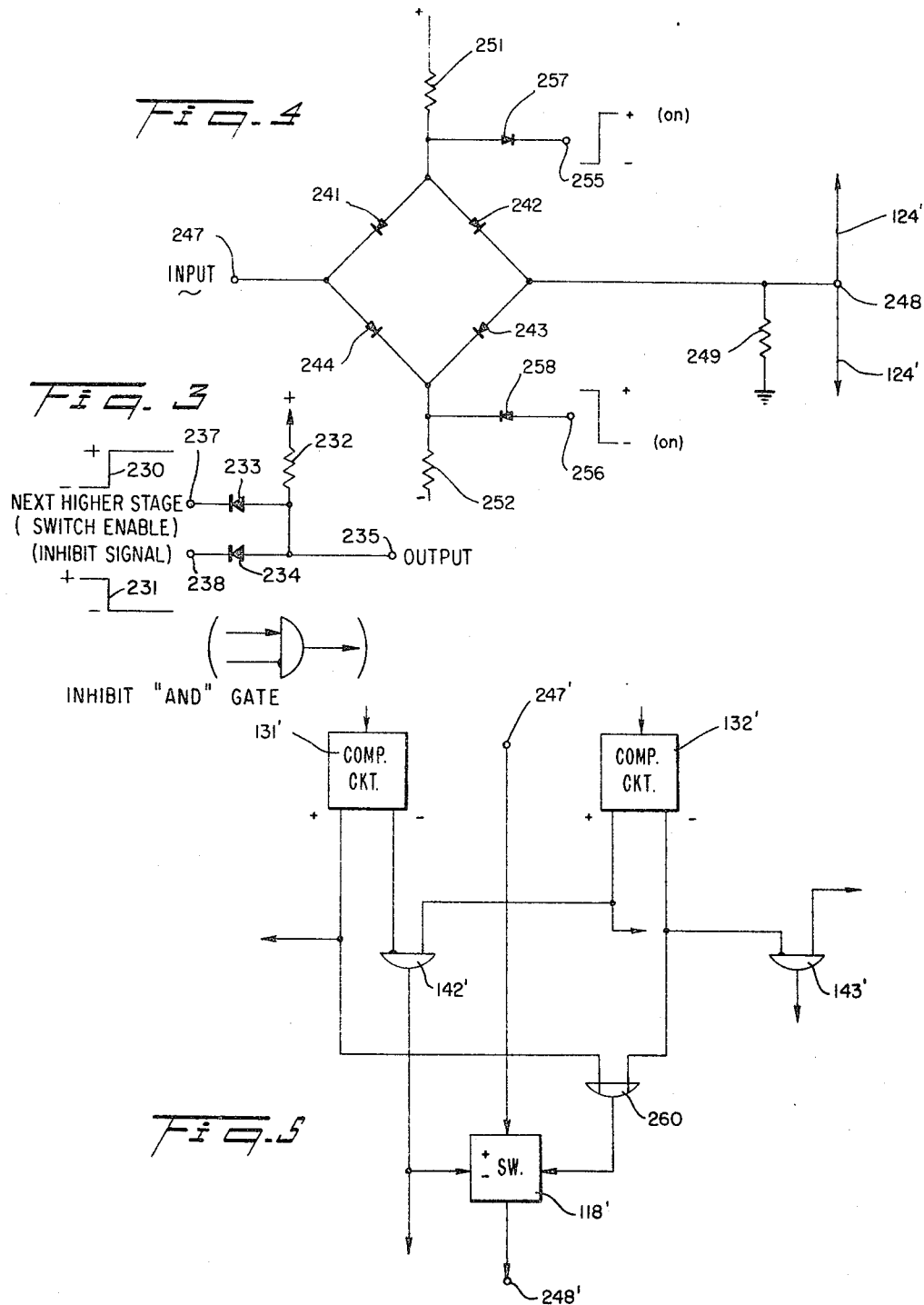

United States Patent Office 3,264,574
Patented August 2, 1966

3,264,574
AMPLIFIER SYSTEM
Robert J. Loofbourrow, Houston, Tex., assignor to Texaco Inc., New York, N.Y., a corporation of Delaware
Continuation of application Ser. No. 150,782, Nov. 7, 1961, which is a division of application Ser. No. 846,435, Oct. 14, 1959. This application Mar. 9, 1965, Ser. No. 441,406.
8 Claims. (Cl. 330—51)

This is a continuation of a divisional application based on the copending application Serial Number 846,435 filed October 14, 1959, now abandoned. The invention claimed herein is concerned with wide dynamic range amplification, wherever applicable.

In spite of the presently advanced state of the art in seismic exploration, there have been few proposals for overcoming the difficulties that are created by reason of the necessary compression of the dynamic range of signal amplitudes that are involved in seismic exploration work. In other words, because of the extreme dynamic range of input signals that are obtained in seismic exploration, particularly where explosives are employed to create the seismic energy that is used and especially where the reflection type of record is made for receiving reflected seismic waves from subsurface strata at relatively great depths; the resulting record that is created provides little or no indication of the exact amplitude of the input signals at any given moment, on the record. Thus, for example, a typical signal level for a reflection seismic record runs from several volts of amplitude at the maximum, early shock portion of the record, to less than a single microvolt at the end of the record where microseisms are being picked up. Therefore, for practical purposes in order to make a record, there has been some form of compression employed to maintain a much reduced range of output signal amplitudes. For these reasons, there are two major drawbacks involved in the resulting records that have been made. One of these drawbacks is that no accurate knowledge of the exact amplitude of the input signals at any given place on the record may be had. Secondly, there is the factor that considerable weak changes of input signal may have been masked or entirely lost in the recording of the signals; by reason of the compression which must always involve some time constant in the compression circuit elements thereof.

It will be appreciated by anyone skilled in the art that an application for the invention as defined herein, might be a digital volt meter. The invention provides an arrangement for dividing the full range of signals (voltage to be measured) into a predetermined number of parts. Also, automatic switching maintains the output signals within a given amplitude range. The resulting system output signal might then be digitized, while maintaining an indication of the portion of the entire range that is connected to the system output at any given time.

Another object of the invention is to provide a special amplifier system, for use generally wherever it may apply. Such amplifier system is one that accomplishes a breaking down of an extensive input signal range into a number of separate parts, with the inclusion of switching from one to another part, so as to keep that part connected to the output which encompasses the then signal of the full input range, at any given time.

Another feature of the invention may be briefly described as an amplifier system for producing output signals having a predetermined limited dynamic amplitude range that constitutes a predetermined portion of the full range of input signals. Such system comprises in combination an input signal circuit connected to the first of a plurality of amplifiers in series. The system also comprises a common output circuit for all of said amplifiers and a switch means for selectively connecting one of said amplifiers at a time to said output circuit. In the system, each amplifier is connected to the output circuit only so long as the output signals thereof fall within the predetermined limited range.

The foregoing and other objects and benefits of the invention will be appreciated more fully in connection with the more detailed description which follows and which is illustrated in the drawings, in which:

FIGS. 1 and 1a together illustrate a complete schematic showing of a system for making a digital record of the signals that are generated by a group of geophones;

FIG. 3 shows the circuit elements involved in a typical one of the so-called "and" gates of the system shown in FIG. 1;

Figure 2:
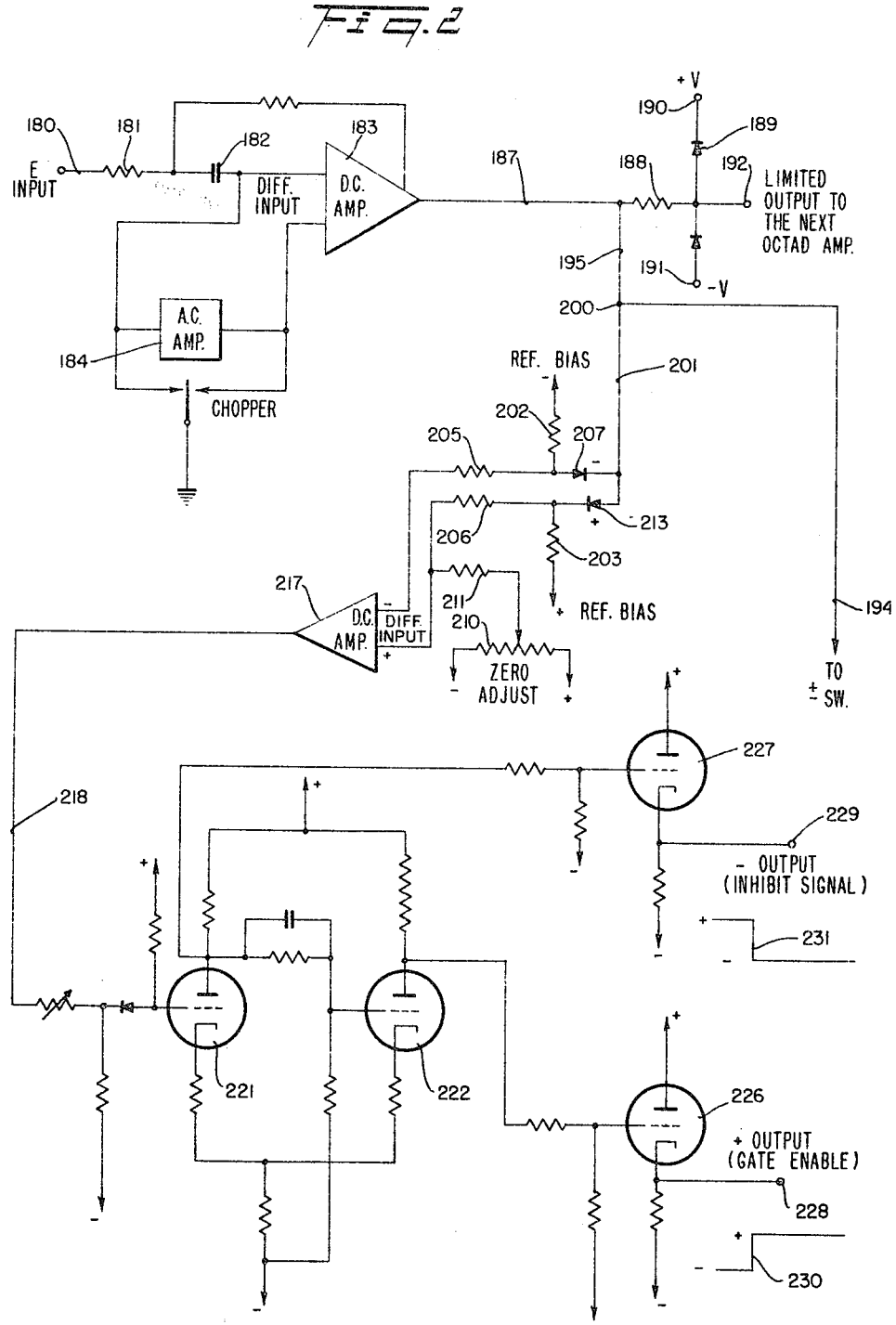
FIG. 2 is a schematic circuit diagram, illustrating in more detail the elements involved in one of the comparison circuits shown in FIG. 1.

FIG. 4 is a schematic circuit diagram showing a particular type of bidirectional switch that may be employed as one of the switch elements of the FIG. 1 system; and, FIG. 5 is a schematic block diagram showing one of the bidirectional switch elements and its relationship to the adjacent comparison circuits of the FIG. 1 system, which indicates the changes that are required where a bidirectional switch according to FIG. 4 is to be employed.

As illustrated in FIGURES 1 and 1a each sample of a geophone signal, passes over the circuit connection 30 to a junction point 101 and then goes to the input of an octad amplifier 102 in addition to travelling over another parallel circuit connection 103 to a bidirectional switch 104. The term "octad" is used here to mean the order of amplitude amplification that is gained by signals being amplified. This is indicated by the symbol "X8" shown in parantheses on each of the amplifier blocks in the diagram. It will be observed that there are six more octad amplifiers 107 through 112 that are connected in series or cascade. Thus, there are seven amplifiers connected in cascade relative to one another. Also there are additional bidirectional switches 115 through 121.

The output side of each of the bidirectional switches 104 and 115 through 121, are connected in parallel to a common circuit connection 124 for carrying the output signals from any one of the switches that is closed, over to the input of a sample-hold circuit element 125. This sample-hold circuit 125 receives each of the sampled signals, and holds it for the period necessary to complete the conversion from analog to digital that takes place in the high speed converter 41. As the signal arrives at the sample-hold circuit 125, it is not encoded by the converter 41 until after a short delay that is determined by the delay element 45. This is done in order to allow time for switching transients to be dissipated.

The sample-hold circuit 125 may be considered part of the converter 41, and as with regard to the converter, the details of the sample-hold circuit per se form no part of the invention.

The sampled signal, that is to be converted to a digital representation thereof for recording, is held within a predetermined amplitude range or signal level for introduction to the converter 41. This is accomplished by means of the system according to this invention, which includes in addition to the octad amplifiers 102 and 107 through 112, a plurality of comparator circuits 128 through 134 and the bidirectional switches 104 and 115 through 121. These bidirectional switches 104, 115–121 are electronic in nature and could be termed gates, but to avoid confusion with the different "and" gates and "or" buffers shown, will be called switches. They are under control of inhibit and gates 138 through 145.

The operation of the system for maintaining the amplitude of the output sample signal within a constant range for application to the converter, may be understood in general with reference to the system showing of FIG. 1. Thus, beginning with a minimum amplitude signal over the circuit connection 30; it is pointed out that all of the switches 104 and 115 through 120 are held open, whereas switch 121 is the only switch that is closed under these conditions. Consequently, from a zero amplitude signal up to a predetermined very small amplitude, the signal will be directed to the input of the octad amplifiers 102 and 107 through 112 in series, via an input connection 148 from the junction point 101. Therefore this signal is amplified $8^7$ times and then is delivered over a circuit connection 149 to the bidirectional switch 121. So long as the signal remains below a predetermined amplitude, it is thus delivered over the circuit 149, through the closed switch 121 and to the common output circuit 124 for delivery to the converter 41 via the sample-hold circuit 125. However, as soon as the signal exceeds such predetermined amplitude, this condition will be determined by the comparator circuit 134, and it will provide output signals over a pair of circuits indicated by connections 152 and 153.

The signal carried by circuit connection 152 is in the nature of an inhibit signal. The specific nature of this signal will appear more fully below. Here, it is sufficient to note that the inhibit signal will pass through the inhibit and gate 145, and act to inhibit or open the switch 121 which was otherwise closed. Simultaneously, an enable signal will be provided from comparator circuit 134 over the other output circuit 153. This enable signal will be delivered to another inhibit and gate 144 which will pass this enabling signal to the bidirectional switch 120 so as to close it.

In the foregoing manner, the output signal delivered to the common circuit 124 is not allowed to exceed a predetermined maximum amplitude; but it is dropped back to a preceding stage of the series of steps of amplification (octad amplifiers 102, 107–112) so that it is delivered to the circuit 124, once again within the predetermined amplitude range that is desired (for the input signals to the converter 41).

This procedure continues back down, or on up, the series of amplifiers so as to maintain the output signal that is connected to the common output circuit 124, always within the same amplitude range. Thus, as the amplitude of the input signal carried by connection 30 reaches its maximum range, the signals to the output circuit 124 will be those carried by the circuit 103 to the switch 104. This circuit goes directly to the output circuit 124 without any amplification at all so long as the signals remain in the predetermined range.

Because of the fact that any one of the digitally recorded signals that goes in binary form on the magnetic tape, will be indistinguishable from any other of the signals that are derived from different amplitude ranges; an indication must be carried to determine which amplitude range the signal lies within. This determination is made in a straight binary manner, by merely providing output signals that correspond to the enable, or closed condition for each of the bidirectional switches 104 and 115 through 121.

By using a straight binary system it is not necessary to provide a signal output in correspondence with the enable condition of the switch 104, for the reason that this switch being closed represents the 1:1 ratio of signal amplitudes between the input and the output; and such condition may be represented by a zero or absence of any signal. Furthermore, since it is only necessary to indicate which of seven switches (i.e. switches 115 through 121) is closed, or enabled; a pure binary signal output circuit arrangement is employed, using only three circuits in combination. Thus, there is a circuit connection 156 through 162 that leads from the output, in each case, of the corresponding inhibit and gate 139 through 145 respectively. These connections (156–162) each lead to an indicator output terminal that is captioned $8^{-1}$ through $8^{-7}$ respectively. Of course, these indicator output circuits may have some type of indication element (not shown) connected thereto for indicating which one of the circuits is in an enable condition. However, for recording in digital form on the magnetic tape record, it is most expedient to employ three common circuit connections 165, 166 and 167 for providing binary type indication of which one of the switches 104, 115–121 is in the closed or enable condition. The binary type output is applied to the three circuits 165, 166 and 167 by means of a plurality of diodes 170 that connect each of the indicator circuits to the proper one or more of the three binary indication circuits so as to provide a straight binary output indication of the indicator circuit that is energized. The signals that are thus carried over the three circuit connections 165, 166 and 167, are delivered to the input of another sample and hold circuit 171 (FIG. 1a). Then these signals are sent on (when the delayed clock pulse is received from the junction point 47 over a circuit connection 172) to the or buffers 80, 81 and 82 via the illustrated circuit connections to the corresponding recording amplifiers 90 for actuation of the corresponding recording head 13 located adjacent to the indicated three tracks on the magnetic tape record.

In view of the foregoing explanation of the system, it will be understood that as each channel signal passes through the system, it is automatically switched so as to be connected directly (or after passing through one or more stages of amplification by the amplifiers 102, 107–112) to the circuit that leads to the analog-digital converter 41. This is done in order to maintain the amplitude level within a predetermined range. The signal is thus passed into the high speed analog to digital converter 41 where the conversion operation takes place.

It will be appreciated that there are many different types of amplifiers that may be employed for each of the octad amplifiers 102 and 107 through 112. A preferred type of amplifier, however, is one that is a high gain D.C. chopper-stabilized type of amplifier, which has enough negative feed-back to provide for the required gain of eight in a linear manner throughout the full range. One such amplifier is a commercial item that is known as a "Philbrick Operational Amplifier—U.S.A. —3." Such amplifier is manufactured by George A. Philbrick Researchers Incorporated, Boston, Massachusetts.

FIGURE 2

It has been pointed out above how the system operates to maintain the output signals (from the series of octad amplifiers 102, 107–112) on the common output circuit 124, at a given amplitude range. A more detailed explanation of this operation is as follows, in connection with the more detailed circuit illustration of FIG. 2. Referring to FIG. 2 it is pointed out that there is shown a typical octad amplifier which may be any one of the amplifiers 102 or 107 through 112. Each such amplifier includes an input circuit connection 180 that leads to the input of the amplifier through a resistor 181 and a capacitor 182. It is pointed out that the total amplifier includes a D.C. amplifier 183, and a chopper stabilizer with an A.C. amplifier 184 as indicated by the captions. The output of the octad amplifier, leads over a circuit connection 187 to an amplitude limiting circuit arrangement that precedes the connection of this output to the input of the next succeeding octad amplifier. This amplitude limiting arrangement includes a resistor 188 and a pair of diodes 189 that are connected to terminals 190 and 191 which have a positive voltage and a negative voltage respectively, connected thereto for setting the level of the amplitude limiting action desired. As indicated by the caption, the output as thus limited is connected to a terminal 192 that will be connected to the input of the next succeeding octad amplifier. This amplitude limiting arrangement is provided in order to avoid overloading or saturating the amplifier that receives the output signals from this stage of amplification. It will be appreciated that the limiting voltages applied at terminals 190 and 191 will be set so that the desired range of signal amplitudes may pass without being limited.

It will be observed that there is output circuit connection for signals from the octad amplifier, prior to the limiting action, i.e. from the circuit connection 187 to a circuit connection 194 directly, via a connection 195. Connection 194 leads to the corresponding bidirectional switch element for the particular stage of amplification of the system. Thus for example, if the octad amplifier being considered in detail is taken as amplifier 109 (FIG. 1), the bidirectional switch to which circuit connection 194 is connected, will be the switch 118.

Also connected directly to the output connection 187 there is a comparator circuit, which would be comparator 131 of the above example (in the FIG. 1 system). Such comparator may take the form shown in FIG. 2. There is a pair of diode rectifiers 207 and 213 connected to receive the output signals from the octad amplifier, and to pass those exceeding a predetermined amplitude of either polarity.

The diodes 207 and 213 are oppositely connected, as illustrated, to a junction point 200 by a connection 201. Each diode is back biased by a predetermined comparison voltage which is set at the predetermined set maximum amplitude. Thus, a resistor 202 is connected to diode 207 at one end thereof while the other end has a negative potential that acts as the negative comparison voltage, connected thereto as indicated by the caption "Ref. Bias" (—). Similarly the other diode 213 has a resistor 203 connected thereto with the positive reference potential connected to the other end, again as indicated by the other caption "Ref. Bias" (+).

These two comparator circuits are connected to the inputs of a differential D.C. amplifier 217 of a special type having high gain. In this manner, no signal is applied to the input of amplifier 217 so long as the amplitude of the signals from the octad amplifier (on connection 201) do not exceed the predetermined set maximum, either in a positive or a negative sense. When the signals do exceed this amplitude level, either positive or negative; the current flow through the resistor 202 and 203 causes a small voltage drop which is fed to one of the inputs of the amplifier 217 via either resistor 205 or a resistor 206. In either case, the amplifier 217 produces a positive D.C. voltage of considerable magnitude. Such D.C. signal will appear on a circuit connection 218.

There is a zero adjustment potentiometer that is connected to the positive input circuit for the amplifier 217. This merely includes a variable potentiometer-resistor 210 that has the ends thereof connected to a positive and to a negative source as indicated. A resistor 211 has one end connected to the variable tap on resistor 210 while the other end is connected to the positive input circuit of the amplifier 217. The setting of the variable tap will be adjusted to produce a zero output on connection 218 (or slightly negative), when there is no input to the amplifier 217, i.e. when the signals on connection 201 are below the predetermined amplitude.

The amplifier 217 might take different forms; and it forms no part per se of the invention. However, it is preferred to employ an amplifier that is commercially available and is manufactured by George A. Philbrick Researchers, Inc., Boston, Massachusetts, known by the model designation K2-X.

In order to transform the single positive voltage rise signal on the circuit 218 into the required two signals, i.e. gate enable signal, plus the simultaneous inhibit signal; there is employed a Schmitt trigger circuit that is triggered to flip over to its opposite state upon receipt of the single voltage rise signal on circuit 218. Then, there are two cathode follower output signal elements connected to the Schmitt trigger for creating the enable and the inhibit signals themselves. Thus, still referring to FIG. 2 it will be observed that the D.C. amplifier 217 which receives signals carried by the input circuits thereof, and which provides amplifier output signals on the circuit connection 218; feeds the input to a Schmitt trigger circuit. The Schmitt trigger has two triode tubes 221 and 222 that are connected together as shown, in a known manner, which provides for a triggering from one stable state to another upon the receipt of an input signal on the circuit connection 218. The circuit constants of the Schmitt trigger circuit are arranged so that the trigger stands (in the absence of a signal on circuit 218) with the left hand tube 221 cut off and the right hand tube 222 conducting. The voltage divider on the grid circuit of tube 221 is arranged so that when a positive signal voltage appears on circuit connection 218, the grid of tube 221 will be raised to a more positive potential so that the tube will conduct. When tube 221 is changed to a conducting stage, the plate voltage thereof will fall and this voltage drop is transferred by the illustrated circuit to the grid of the other triode 222 so that its grid voltage goes down and it is cut off to become nonconducting.

Then, as indicated above, in order to provide the output enable signal, and simultaneously the output inhibit signal; there is a connection to the plate of each of the Schmitt trigger triodes 222 and 221 respectively. These connections are carried to the grid circuits of a pair of triodes 226 and 227; and these triodes are connected as cathode followers, insofar as the output signals therefrom are concerned. Thus, there is an output terminal 228 that is connected to the triode 226 and provides the enable signal; while there is an output terminal 229 that is connected to the other triode 227 and provides the inhibit signal. Cathode follower tubes 226 and 227 are biased to stand in the opposite state from the Schmitt trigger tube to which they are respectively connected. Thus, when the Schmitt trigger is in its first state (without any positive signal on the circuit connection 218), the right hand trigger tube 222 is conducting but the cathode follower tube 226 that is connected thereto is cut off. Similarly in this same state, the left hand trigger tube 221 is cut off but the cathode follower tube 227 connected thereto is conducting. Consequently when the Schmitt trigger flips over, the indicated signals 230 and 231 are created at the terminals 228 and 229. These signals are sharp changes in potential because the action of the Schmitt trigger is sharp, by reason of its characterisitcs.

It is pointed out that when the positive signal on connection 218 at the input to the Schmitt trigger disappears, the trigger tubes 221 and 222 drop back sharply to the first state so that the enable and inhibit signals are removed, i.e. the enable positive potential drops to a negative potential again while the inhibit negative potential jumps back to positive.

FIG. 3 shows a typical circuit for one of the inhibit "and" circuits 138 through 145. Such circuit consists of a resistor 232 that has one end thereof connected to a positive potential source, as indicated; and that is connected at the other end thereof to one side of two diodes or rectifiers 233 and 234. The same end of the resistor 232 that is connected to the diodes is also connected to an output terminal 235. The other electrode of diodes 233 and 234 are each connected to an input terminal 237 and 238 respectively. It will be understood that with an inhibit signal circuit connected to one input terminal 238, e.g. to provide signal 231, and an enable signal circuit connected to the other input terminal 237, e.g. to provide signal 230; the resulting output signal(s) will depend upon the input conditions so as to provide for the desired action. This desired action is such that when there is an enable signal but no inhibit signal, there will be a positive output voltage at terminal 235. But on the other hand, when there is an enable signal plus an inhibit signal; the inhibit signal will hold the voltage of output terminal 235 to the negative potential, or no output status, and consequently there will be no output signal. On the other hand, if there is no enable signal on the input terminal to which it is connected; there will be no output signal on terminal 235 irrespective of whether or not there is an inhibit signal on the other input terminal. The latter is true since the enable signal circuit will be held at negative voltage which maintains the output 235 at negative voltage also.

It will be observed that the signal symbols 230, 231 and the captions on both FIG. 3 and FIG. 2 indicate the potential conditions in connection with the circuits. Consequently the manner of connecting these elements into the entire system (that is indicated in block form in FIG. 1) will be amply clear. Furthermore, it will be noted that there is shown in FIG. 3 an indication of the inhibit "and" gate symbol, that is employed in the entire system showing of FIG. 1.

As has been indicated above, the bidirectional switches 104 and 115 through 121, may take various forms and form no part per se of this invention. One such bidirectional switch is shown by a publication in the AIEE Journal for March 1955 entitled "Junction Transistors Used as Switches" by R. L. Bright. Similarly, there is a bidirectional switch that would be applicable, shown in a publication that was presented at the IRE National Convention in New York, New York on March 21, 1956 entitled "The Development of a High-Speed Electronic Multiplexer and Coder for Use With PCM Telemeter" by Robert D. Bishop and Robert E. Marquand. These bidirectional switches are electronic in nature, and are often referred to as gates. The opening and closing of such a switch is under control of a signal on a control circuit; which in the system diagram of FIG. 1 is indicated by the arrow on the left hand side of each of the switches 104 and 115 through 121. These arrows indicate the input gate control circuit in each case, which is connected to the output of each of the inhibit and gates as shown.

It will be observed that each comparator circuit 128 through 134 has two output circuits, e.g. output terminals 228 and 229 of the detailed showing for a comparator circuit that is illustrated in FIG. 2. Furthermore, the inhibit signal output circuit (indicated in FIG. 1 by a minus sign) for each comparator circuit, is connected to a given inhibit and gate element; while the enable circuit of each comparator is connected to the other input of the adjacent inhibit and gate. Thus for example, assuming that the FIG. 2 circuit is placed in the FIG. 1 system (as the octad amplifier 109 plus the comparator circuit 131); then, the signal output circuit from the octad amplifier 109 that leads to the bidirectional switch 118, is the circuit of FIG. 2 including connections 187, 195, 200 and 194. At the same time (under these assumptions) the comparator circuit 131 has as its output the two switch control signal circuits shown. The inhibit signal circuit (terminal 229) is connected to gate 142. The enable signal circuit (terminal 228) however is connected to the gate 141, which controls bidirectional switch 117.

The operation of the amplifier system for producing output signals having a predetermined limited dynamic amplitude range, may be reviewed by referring to FIG. 1 and where necessary to FIG. 2. Assuming that the comparator circuit of FIG. 2 is comparator 131 of the FIG. 1 system; the operation of the control of the group of switches 104 and 115 through 121, will be as follows.

Assuming that the amplitude of the signals existing at the amplifier system input (on circuit connection 30) is such that the amplitude of the output signals of octad amplifier 109 fall within the predetermined limited range indicated above, that is desired for the common output circuit 124. Under these conditions the signals from amplifier 109 are passed through the switch 118 to the common output circuit 124. Switch 118 is held closed by reason of the signal applied to the control circuit thereof, which control circuit is connected to the output of the and gate 142. Thus, this and gate is providing an enable signal for the switch 118 by reason of the fact that the next succeeding stage of amplification of the system signals (octad amplifier 110) is providing an output that is greater than the predetermined amplitude. Therefore the comparator circuit 132 has its outputs switched over to give enable and inhibit signals at the corresponding output circuits thereof. The enable signal from this comparator circuit 132 is applied to the and gate 142 over the illustrated circuit; and since the comparator circuit 131 is not providing any inhibit and enable signals therefrom, there is no inhibit signal being applied to the and gate 142, which would counteract the enable signal.

It is pointed out that all of the amplifiers succeeding octad amplifier 109 in the series (110, 111 and 112) will be providing output signals that exceed the predetermined amplitude so that the comparator circuits controlled thereby will be switched over. Therefore the inhibit signals from these comparator circuits (132, 133 and 134) will be in control of the corresponding switches 119, 120 and 121 via the inhibit and circuits 143, 144 and 145. Thus, all of these switches (119, 120, 121) will be open.

Also at the same time, the amplifiers preceding the amplifier 109 (i.e. 102, 107 and 108) will have output signals with amplitudes less than the predetermined amplitude so that the comparator circuits controlled thereby will not be switched over. Therefore there will not be an enable signal from any of the comparator circuits 128, 129 and 130, and each of the switches 104, 115 and 116 will be open.

Assuming that the signal amplitudes increase so that the signals from amplifier 109 exceed the predetermined amplitude, then the comparator circuit 131 will be actuated to provide inhibit and enable signals therefrom. Also the and gate 142 will be held to a negative potential by its inhibit signal (from circuit 131) and consequently the bidirectional switch 118 will be opened. However, at the same time the previous or preceding and gate 141 will pass the enable signal (from circuit 131) for closing the bidirectional switch 117.

Now, assuming that the signal amplitudes decrease to less than one-eighth of the predetermined maximum at the output of amplifier 109; then the level of amplitudes of signals from amplifier 110 will fall to less than the predetermined maximum (which they were exceeding). Consequently comparator circuit 132 will flip back at its outputs and stop providing an enable signal to and gate 142. Therefore gate 142 will not pass any positive potential and the switch 118 will be opened. Simultaneously, however, the change in state of comparator 132 will remove the inhibit signal output therefrom; and consequently the and gate 143 will pass a positive signal which will act to close switch 119.

In the foregoing manner, the switches are automatically actuated so as to have closed only that switch which will pass the signals that are at amplitudes that are within the predetermined desired range. This takes place continuously without any substantial delay since none of the octad amplifiers are permitted to become saturated, by reason of the fact that the limiter circuit arrangement shown in FIG. 2 is connected between the output of each octad amplifier and the input of the next succeeding octad amplifier.

It is pointed out that a particular type of bidirectional switch may be employed in accordance with the more detailed circuit shown in FIG. 4. In such case, however, the system arrangement should be modified in accordance with FIG. 5 to provide for the operation of the bidirectional switch according to FIG. 4.

The FIG. 4 bidirectional switch shown is in the nature of a bridge circuit having four rectifiers 241, 242, 243 and 244, one connected in each of the four bridge arms. The polarity of each of these rectifiers is connected in accordance with the accepted symbol for indicating a rectifier. Thus, they are connected to permit current flow down over both branches of the bridge from top to bottom as illustrated in FIG. 4. The bidirectional current flow circuit that is being switched, is that from an input terminal 247 to a common output terminal 248. The path for current flow includes the bridge of four diodes and also there is a resistor 249 that is connected to ground at the other end thereof, as illustrated. The upper and lower diagonal points of the bridge circuits have a pair of resistors 251 and 252 respectively, connected thereto at one end of each resistor. The other end of resistor 251 has a positive potential source connected thereto, while the other end of resistor 252 is connected to a negative potential source, as indicated. Control of the opening and closing of the switch is carried out in connection with signals that are introduced over circuits illustrated having control terminals 255 and 256. There is another rectifier 257 that is connected with its polarity as indicated, between the terminal 255 and the upper diagonal point to which the lower end of resistor 251 is connected. Similarly, there is another rectifier 258 that is connected between the other control terminal 256 and the lower diagonal point of the bridge, that has one end of resistor 252 connected thereto.

It will be observed that there is an indication by means of schematic symbols shown adjacent to the control terminals 255 and 256, that the control of the bidirectional switch is had by the simultaneous application of signals that shift the potential from negative to positive at terminal 255 and from positive to negative at terminal 256. The operation of the bidirectional switching action may be readily understood from the following indication of what happens in the circuit. The switch is closed, or on, when current is flowing vertically down across the bridge network. This takes place so long as the control terminal circuits are not carrying any current, since the path for current flow from the positive potential at the free end of resistor 251 to the negative potential at the free end of resistor 252 is closed with the rectifiers 241, 242, 243 and 244 all connected having their polarity in the proper direction for such flow. Under these conditions, bidirectional A.C. current may flow across the bridge from the input terminal 247 to the output terminal 248 by reason of the fact that the rectifiers are conducting current. However, when the vertical current flow of energy across the bridge is cut off, the switch circuit across the horizontal diagonal of the bridge is opened since the polarity of the diodes is such that there is no free flow path for either positive or negative current flow.

The cutting off of the vertical direction current flow is accomplished by application of signals in accordance with the illustrated symbols. The action in the circuit may be traced as follows: If a negative signal is applied to terminal 255 and at the same time a positive signal is applied at terminal 256, the additional current flow that is caused through resistor 251 (when the terminal 255 becomes nagative) causes the potential of the upper diagonal point of the bridge circuit to become negative with respect to the potentials at the horizontal diagonal points. Similarly, the bottom half of the bridge is also effectively cut off by the application of the positive potential at terminal 256 which allows current to flow through rectifier 258 and resistor 252 so that the potential of the lower diagonal point of the bridge becomes enough more positive than it was so that the rectifiers 244 and 243 become back biased.

In order to use a bidirectional switch in accordance with the FIG. 4 showing, in the system according to FIG. 1, the modification in accordance with FIG. 5 must be carried out. Thus, taking for example a comparator circuit 131' and the next adjacent comparator circuit 132' and operating a bidirectional switch 118' therefrom; the circuit arrangement will be shown in FIG. 5. Likewise, there is an inhibit and gate 142' and also the next adjacent inhibit and gate 143'. It is pointed out that these elements, illustrated in FIG. 5 correspond with the elements shown in the system of FIG. 1. Furthermore, the same reference numbers are employed but a prime mark is added in the FIG. 5 illustration.

Because the bidirectional switch 118' in the FIG. 4 type which employs two control circuits, there must be additional circuit connections provided to accommodate the additional control signals. Thus, there is an or buffer element 260 that is connected to both the inhibit signal circuit of comparator circuit 132' and the enable signal circuit of the comparator 131'. This arrangement provides for the simultaneous additional control signal that is of the opposite sign. The operation of the bidirectional switch 118' is in accordance with FIG. 4, while the operation insofar as the system is concerned is substantially like the operation of the comparable switch, e.g. switch 118 of the system shown in FIG. 1. Thus, it will be clear to any skilled in the art that FIGS. 4 and 5 showings indicate a modification which may be directly applied to the system as shown and described previously in connection with FIG. 1.

While a preferred embodiment of the invention has been described in considerable detail in accordance with the applicable statutes, this is not to be taken as in any way limiting the invention but merely as being descriptive thereof.

I claim:

1. An amplifier system for producing output signals having a predetermined limited dynamic amplitude range that constitutes a predetermined portion of the full amplitude range of input signals, comprising in combination an input signal circuit, said input signal circuit having said full amplitude range of input signals impressed thereon and being connected to the first one of a plurality of amplifiers in series, circuit means for limiting the maximum amplitude of output signals from each of said amplifiers to substantially equal a predetermined maximum amplitude in order to avoid overloading the succeeding amplifier in the series, a common output circuit for each of said amplifiers in the alternative, switch means for selectively connecting one of said amplifiers at a time to said output circuit, said switch means including a switch connecting the output of each amplifier to said common output circuit, and signal amplitude comparison means having a predetermined signal set therein and being connected to the output of each amplifier for opening the switch from such amplifier to said output circuit when the the amplitude of the output from that amplifier exceeds said predetermined amplitude level slightly less than said limited maximum amplitude while simultaneously closing the switch from the preceding amplifier to said output circuit.

2. An amplifier system for producing output signals having a predetermined limited dynamic amplitude range that constitutes a predetermined portion of the full amplitude range of input signals, comprising in combination an input signal circuit, said input signal circuit having said full amplitude range of input signals impressed thereon and being connected to the first one of a plurality of amplifiers in series, circuit means for limiting the maximum amplitude of output signals from each of said amplifiers to substantially equal a predetermined maximum amplitude in order to avoid overloading the succeeding amplifier in the series, a common output circuit for each of said amplifiers in the alternative, switch means for selectively connecting one of said amplifiers at a time to said output circuit, said switch means including a switch connecting the output of each amplifier to said common output circuit, signal amplitude comparison means having a predetermined signal set therein and being connected to the output of each amplifier for opening the switch from such amplifier to said common output circuit when the amplitude of the output from that amplifier exceeds a predetermined amplitude while simultaneously tending to close the switch from the preceding amplifier to said common output circuit, and an indicator circuit connected to each of said switches for indicating which of the switches is closed in order to determine which portion of the full range is connected to the output circuit.

3. An amplifier system for producing output signals having a predetermined limited dynamic amplitude range that constitutes a predetermined portion of the full amplitude range of input signals, comprising in combination an input signal circuit, said input signal circuit having said full amplitude range of input signals impressed thereon and being connected to the first one of a plurality of amplifier stages, a common output circuit for all of said amplifier stages, switch means for selectively connecting the output of one of said amplifier stages at a time to said common output circuit, said switch means including a switch connecting the output of each amplifier stage to said common output circuit, signal amplitude comparison means having a predetermined signal for each amplifier stage set therein and being connected to the output of each amplifier stage for receiving signals therefrom to be compared with said predetermined signals, said comparison means providing a pair of switch control signals for each amplifier stage, and gate means receiving groups of two of said switch control signals one from each of adjacent stages for opening the switch from each amplifier stage to said output circuit when the amplitude of the output from that amplifier stage exceeds said predetermined signal while simultaneously closing the switch from the preceding amplifier stage to said output circuit.

4. An amplifier system according to claim 3 further including an additional circuit means for directly connecting said input signal circuit to said common output circuit with a switch, and gate means for closing said switch when the amplitude level from the output of the first amplifier stage exceeds said predetermined level.

5. In an amplifier system having an input circuit adapted to receive signals within a very large dynamic amplitude range and having an output circuit adapted to pass only signals within a smaller dynamic amplitude range than the dynamic amplitude range of the input signals, the combination comprising means for amplifying said input signals in a plurality of steps of amplification, a plurality of comparison means each having a predetermined signal amplitude set therein and having an input connected from the output of one of said steps of amplification respectively, each of said comparison means providing a pair of outputs for a respective step of amplification, a plurality of gate means each connected to receive two of said last named outputs one from each of adjacent ones of said steps of amplifiication, and switch means connected between each of said steps of amplification and said output circuit and being controlled by said gate means for connecting each of said steps of amplification alternatively to said output circuit.

6. The combination according to claim 5 wherein said switch means are electronic.

7. The combination according to claim 5 including in addition a direct connection from said input circuit to said output circuit via said switch means, whereby maximum amplitude signals within said very large dynamic amplitude range may pass directly without any amplification.

8. The combination according to claim 7 wherein said switch means are electronic.

References Cited by the Examiner

UNITED STATES PATENTS

| 1,788,513 | 1/1931 | Fultz | 330—124 X |
| 2,009,229 | 7/1935 | Hammond. | |

ROY LAKE, *Primary Examiner.*

N. KAUFMAN, *Assistant Examiner.*